United States Patent [19]

Häggbom et al.

[11] Patent Number: 4,676,433
[45] Date of Patent: Jun. 30, 1987

[54] REGULATING MEANS FOR CONTROLLING THE SUPPLY OF HEAT TO A CONFINED SPACE, AND MEANS FOR ESTABLISHING WHEN THE HEATING REQUIREMENT OF AN AIR MASS EXCEEDS A PRE-DETERMINED VALUE, AND BY HOW MUCH

[75] Inventors: Sune Häggbom, Norrtälje; Per O. Nylund, Åkersberga; Arne Lind, Bromma, all of Sweden

[73] Assignee: Tyréns Företagsgrupp AB, Sundbyberg, Sweden

[21] Appl. No.: 716,169

[22] Filed: Mar. 26, 1985

[30] Foreign Application Priority Data

Mar. 23, 1984 [SE] Sweden .................. 8401642
Jul. 9, 1984 [SE] Sweden .................. 8403627

[51] Int. Cl.⁴ ............................................. F25B 29/00
[52] U.S. Cl. .................................... 236/10; 165/16; 236/91 F; 374/40
[58] Field of Search .................. 236/94, 10, 49, 91 F; 165/11 R, 16; 62/126; 364/557; 374/33, 39–41

[56] References Cited

U.S. PATENT DOCUMENTS

| | | | |
|---|---|---|---|
| 4,227,645 | 10/1980 | La Farge et al. | 236/94 X |
| 4,347,708 | 9/1982 | Bussjager | 165/16 X |
| 4,362,404 | 12/1982 | Armstrong | 374/39 |
| 4,457,357 | 7/1984 | Van Arnhem | 165/16 X |

FOREIGN PATENT DOCUMENTS

| | | |
|---|---|---|
| 612007 | 1/1977 | Fed. Rep. of Germany . |
| 2528749 | 1/1977 | Fed. Rep. of Germany . |
| 3138844 | 4/1983 | Fed. Rep. of Germany . |
| 3147669 | 8/1983 | Fed. Rep. of Germany . |
| 0072215 | 5/1980 | Japan .................. 236/91 F |

Primary Examiner—William E. Wayner
Attorney, Agent, or Firm—Burns, Doane, Swecker & Mathis

[57] ABSTRACT

A regulating arrangement intended for supplying heat to a confined space, including a heating source (13), a regulating means (12) intended for regulated heat supply from the heating source, a device for detecting one or a plurality of measurement values and connected (12a, 12b) to the regulating means, which in dependence on received measurement values regulates the amount of heat delivered by the heating source. The regulating means (12) is controlled (10b) by a device arranged to detect the actual heating requirement of the ventilation air at that moment in time, or for detecting a part of this heat requirement.

There is also provided an arrangement or a device for establishing when the requirement to heat an air mass to achieve a pre-determined temperature increase exceeds a pre-determined heating requirement and by how much, by causing the air mass an energy delivering means (4) and establishing the energy taken-up by the air mass and the heat content of the mass at that moment in time. The energy taken-up by the air mass is compared with a theoretically and/or empirically established energy uptake applicable to an air mass having a pre-determined heating requirement or a pre-determined water content in liquid phase, there being evaluated from the established energy difference the actual higher and/or lower heating requirement of the air at that moment in time.

11 Claims, 4 Drawing Figures

REGULATING MEANS FOR CONTROLLING THE SUPPLY OF HEAT TO A CONFINED SPACE, AND MEANS FOR ESTABLISHING WHEN THE HEATING REQUIREMENT OF AN AIR MASS EXCEEDS A PRE-DETERMINED VALUE, AND BY HOW MUCH

TECHNICAL FIELD

The present invention relates primarily to regulating means for controlling the supply of heat to a confined space, with which regulation is effected to control temperature in a space.

The invention is primarily intended for application in which conditions are created for regulating the supply of heat to spaces in buildings intended as living accommodation, for storage purposes and the like, and can be applied to particular advantage when desiring to maintain a given constant temperature in a confined space or when the temperature is to be allowed to vary in dependence of time and in dependence of the normal rythm of the day.

The invention also relates, although not primarily, to means for establishing when the amount of heat required to raise the temperature of an air mass to a given level exceeds a pre-determined heating requirement, and by how much.

BACKGROUND ART

Various types of heat-supply regulating means are known to the art. These regulating means are normally controlled by prevailing ambient temperatures.

Heat-supply regulating means for dwellings, shops, storage installation, warehouses and like buildings comprise heat-emitting and delivering devices controlled by apparatus therefor, normally in dependence on the prevailing ambient temperature, temperature variations per unit of time, etc.. It is normal in such arrangements to permit the heat-delivering device to regulate the water temperature of a water-carried heating system.

As an example of one such known arrangement, reference is made to the use described in the German Offenlegungsschrift 25 28 749.

The use described and illustrated in the German Offenlegungsschrift 31 38 844 can also be considered to form part of this art.

Practical experience has shown that such heating control systems as those employing a device which is responsive to ambient temperature as a means for controlling the heating system function relatively satisfactorily within the majority of temperature ranges. It has been observed, however, that particularly when temperatures lie around 0° C., malfunctions occur in these control systems, since the indoor temperature often falls beneath a desired level, often to such an extent as to lie beneath a so-called comfort level.

Various solutions to this problem have been proposed, in the form of means incorporated in the heating circuit which when the ambient temperature lies around 0° C. deceive the control equipment, via different compensating circuits, into believing that the ambient temperature is lower than it actually is and consequently to send to the control equipment impulses which correspond to a considerable increase in heat requirements.

The apparatus illustrated and described in the German Offenlegungsschrift 31 47 669 also forms part of the known art.

This specification refers to a method for heating confined spaces, particularly workshop localities and like spaces used for certain periods of time for industrial purposes, in which working periods of stable working temperature are to be interrupted by periods of lower temperature, and in which heating of the confined space, upon completion of a low-temperature period, to the requisite working temperature shall be effected within a given limited period of time. In this method, the prevailing humidity of the enclosed space is determined and the value obtained is used as a control magnitude in the heating of said space.

Also forming part of the known art is an arrangement for determining the humidity of a gas flow, by supplying energy and measuring temperature variations. One such arrangement is described and illustrated in Swiss Pat. No. 612 007.

DISCLOSURE OF THE PRESENT INVENTION
TECHNICAL PROBLEM

It is obvious that in a heat-regulating system for confined spaces the ambient air introduced into a confined space must be heated. This ambient being intended to provide circulation of air within the space and compensating for stale air evacuated therefrom (this ambient air being termed ventilation air). The ambient air or ventilation air is referred to hereinafter as the "air volume" and pertains to the air supply (air volume) per unit of time.

It has now been found that the heating requirement of the ambient air (the amount of energy required to heat a given volume of ambient air to a given indoor temperature) varies considerably, due to the fact that the ambient air contains water in liquid phase. Consequently, a technical problem in this regard is one of creating conditions whereby the regulating system can be controlled in dependence on the heating requirement of the air entering the space at that time, or in dependence on the additional energy required to achieve a desired change in temperature of ventilation air allocated a high heating requirement compared with ventilation air having a standard heating requirement and/or a pre-determined heating requirement.

Thus, a technical problem exists in providing conditions which enable a further control magnitude to be supplied to the regulating system or apparatus, namely a control magnitude which is dependent on the heating requirement of the ambient air at that particular time, this requirement being very strongly related to the water content of the ambient air, and then not primarily on the relative humidity of the air, which expresses the water content of the air in gas phase, but primarily on the total humidity of the air, which also includes the water content of the air in liquid phase.

The present invention is thus based on the insight that the air volume to be heated and supplied to a confined space as ventilation air has a heating requirement which varies with time, i.e. that for different time periods and for air volumes to be heated to a given temperature and introduced into said space in each of said time periods there is required a high-energy input in the case of an air volume which has a high heating requirement and a lower energy input in the case of an air volume of lower heating requirement.

This widely varying extent to which the incoming ambient air must be heated at different time periods is conceivably due to the fact that the air contains greater or lesser quantities of freely suspended liquid water-droplets, depending on the time period in question, and that an increase in this free water content greatly contributes to the increased heat requirement of the air, and therewith the increased energy requirement, prevailing for a given temperature increase, when the energy supplied must be capable of converting the freely suspended liquid-water droplets to vapour form. It is obvious that a much higher energy input is required to raise the temperature of an air volume when the air contains water in liquid phase which shall be vapourized when heating the air.

Consequently a qualified technical problem exists in providing a heat-supply regulating arrangement which takes into account the actual heating requirement of an air volume at that moment in time, so that the amount of thermal energy supplied to the confined space is sufficient to vapourize the water content of the air and to raise the temperature thereof to the level desired.

The significance of taking into account the amount of water present in free liquid form is illustrated by the fact that an energy input of 2500 J is required to vapourize 1 g of water, and energy input capable of heating 1 m³ to 2° C.

Consequently, a further qualified technical problem in this respect is one of providing means whereby the amount of energy required to raise the temperature of an air volume or air mass to be accurately established, and to introduce to a control means of a heat-supply regulating arrangement a control signal corresponding to said energy requirement; it has been found particularly complicated to produce an adequate control signal at ambient temperatures around 0° C. and/or when the ambient air and ventilation air contain water in liquid phase.

Although the amount of energy required to convert a quantity of water in liquid form to vapour form is known per se, it is highly difficult to determine in a regulating system how large percentage of the liquid water present shall be converted and how much energy is required herefor.

With reference to the present state of the art it will be understood that one qualified technical problem is that of providing means which will establish in simple fashion momentary rises and/or falls in the actual or true heating requirement of an air volume or mass above and beneath a given heating requirement, and also the extent of such a rise or fall, by causing the air mass or air volume to pass an energy-emitting or energy-delivering device and determining the amount of energy absorbed due to the heating requirement of the air mass.

Another qualified technical problem in this respect is one of providing simple means with which to establish the heating requirement of an air mass containing water in liquid form, and also to determine the thermal energy required to raise the temperature of the air mass while taking into account the heat required to vapourize the water present.

It must be considered a qualified technical problem to be able to realize that an establishment of the heating requirement of the air, particularly at ambient temperatures of around 0° C., can in itself create such conditions that regulating apparatus can be supplied with control magnitudes which within the small temperature range are dependent on the heating requirement of the air, so that the changes in temperature in living apartments or like spaces are not only effected in response to the actual temperature of the ambient air but also in response to the heating requirement of the incoming air volume, and then with particular attention to the liquid-water content of the air and the energy required to convert the liquid water to vapour form.

SOLUTION

The present invention relates to an arrangement for regulating the supply of heat to a confined space, and in particular to such an arrangement which includes a heat source, control means for regulating the heat delivered by the heat source, and a device which is arranged to detect one or more measurement values and which is connected to said control means, which regulates the heat delivered by the heat source in response to the measurement values obtained.

It is proposed in accordance with the invention that in such an arrangement the control means is controlled by a device which is adapted to detect the actual or true heating requirement, or a part of said heating requirement, of the ventilation air at a particular moment in time.

This device shall be arranged to detect and establish the requirement of additional energy, or booster energy, significant to a desired change in temperature of a momentary air volume having a pre-determined heating requirement, or when the air is free from water in liquid phase.

In a simplified version, the device shall be capable of being adapted to evaluate solely the amount of water present in the air volume in liquid phase.

The information thus obtained from the aforesaid device is applied to the control means and is allotted therein a higher priority than information obtained from one or more further device, there being produced in the control means a correction against an increase in the heat delivered when the actual heating requirement of the ventilation air at that moment in time exceeds an assumed or determined heating requirement.

The invention also relates to an arrangement or a device for determining when the heat required to raise the temperature of an air mass to a pre-determined level exceeds an assumed or pre-determined heating requirement, by causing the ventilation-air mass to pass an energy delivering means and by establishing the amount of energy absorbed by said mass of ventilation air and its heat content at that point in time. This air mass shall be capable of comprising only a part of said air volume.

In accordance with the invention the energy taken-up by the air mass is compared with a theoretically and/or empirically determined energy absorption relating to an air mass of established heating requirement or a pre-determined water content in liquid phase, and the actual or true greater and/or lesser heating requirement of the air at that particular moment in time is determined from the energy difference thus established.

The recorded heating requirement is analyzed with a starting point from basic physical principles, wherewith the amount of water in liquid phase contained by the ambient air or ventilation air can be established.

ADVANTAGES

The main advantages afforded by a heat-supply regulating arrangement or system according to the present invention reside in the fact that the means, with the aid of a control signal corresponding to the heating requirement of an air mass, will regulate the heat level or the temperature to a pre-determined comfort level with respect to indoor temperatures irrespective of the liquid-water content of the ambient air or the ventilation air.

The major characterizing features of a heat-supply regulating means according to the present invention are set forth in the characterizing clause of the following Claim 1, while the characterizing features of a device for establishing when the heating requirement of an air mass to achieve a pre-determined rise in temperature exceeds a pre-determined heating requirement, and to what extent, in accordance with the invention are set forth in the characterizing clause of the following Claim 5.

BRIEF DESCRIPTION OF THE DRAWINGS

An embodiment at present preferred and exhibiting the significant characteristics of the invention will now be described with reference to the accompanying drawings, in which.

DESCRIPTION OF AN EMBODIMENT AT PRESENT PREFERRED

Figure 1:
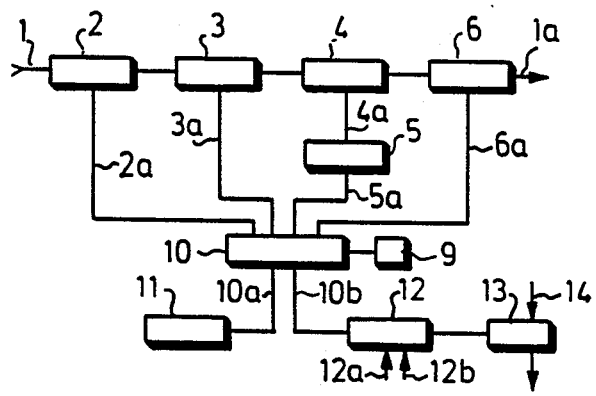
FIG. 1 is a block schematic illustrating a heat-supply regulating arrangement according to the invention.

FIG. 1 illustrates in block schematic form a heat regulating arrangement which is intended to regulate the supply of energy to an incoming air mass, so as to maintain the interior of a confined space at constant temperature. The heat regulating arrangement includes a heating source 13, through which a medium is conducted in conduit means 14, this medium being heated in response to control information obtained from a regulating device 12. Connected to the regulating device 12 are a number of devices which produce signals corresponding to detected measurement values. Thus, information relating to a prevailing ambient temperature can be supplied through a line 12a, while information relating to the prevailing wind strength is obtained through a line 12b. Lines intended for conveying information relating to ground temperature, sunlight intensity, etc., can also be connected to the device 12. The device 12 may also incorporate computer means for controlling the heat source.

Regulating equipment or apparatus of this fundamental design are known to the art in many forms and will not therefore be described in detail.

It can be mentioned, however, that a volume of air serving as ventilation air is introduced per unit of time into a confined space from which stale air is evacuated. Thus, the regulating device is capable of supplying to the confined space a quantity of energy per unit of time sufficient to heat said air volume to the desired temperature.

In the case of earlier regulating systems, the energy supplied is considered solely as a product of the desired increase in temperature, the magnitude of the air volume, and the extent to which the air must be heated, this latter value previously being proximated to a constant.

Thus, the majority of prior known regulating devices and arrangements are designed with a starting-point from the assumption that the heating requirement is, in principle, solely due to the difference in temperature between the inner air and ambient air.

However, in accordance with the invention there is supplied to the regulating device 12, via a line 10b, a regulating value which is dependent on the heat content of the air at that moment in time, so that when the device 12 receives through the lines 12a a control signal which requires a given power control the control signals sent to the heating source 13 are so adapted that the energy delivered through the conduits 14 is adjusted to the energy requirement at that time, also while taking into account any additional energy required to convert water present in liquid form in the ventilation air to vapour form.

Thus, for a desired change in the temperature of ambient air which has a higher heating requirement than that applicable to a standard value, the regulating device 12 shall send to the heat source a control signal for producing further additional energy.

In accordance with the invention it is possible with such apparatus to produce a supplementary control signal which effects the delivery of a further energy addition in dependence on the heating requirement at that time in excess of a pre-determined heating requirement of solely air.

In other instances, the regulating device 12 can be controlled directly from an established true total heating requirement at that moment in time.

The extent to which the water present contributes towards the heating requirement depends practically solely on the water present in liquid form in the ambient air, since the water present in vapour form has very little influence on the heat requirement. FIG. 1 illustrates in block schematic form an apparatus or device with which the heating requirement of an air mass can be established by causing an air mass to pass an energy delivering means and determining the energy taken up by the air mass.

The air volume to be heated and the air mass to be evaluated with respect to its heating requirement are the same or substantially the same gas mixture.

The arrangement according to the invention can be applied with particular advantage to establish readily when the amount of heat required by an air mass to achieve a given temperature increase exceeds a given heating requirement, and by how much, which expressed more simply means an establishment of the amount of water present in the air mass in liquid phase.

There is shown generally an arrangement with which it can be established when the actual heating requirement of an air mass momentarily exceeds and/or falls beneath a pre-determined heat requirement, and by how much.

This can be effected by causing an air mass equal to the ventilation air to pass an energy delivering device and establishing the amount of energy taken-up by the air mass and the increase in temperature. The arrangement can therefore be used to advantage as a measurement-value detecting device connected to regulating apparatus of the aforedescribed kind.

A quantity of ambient air forming part of the air volume to be heated is passed through a conduit 1, which incorporates a flowmeter 2. The measuring values obtained at that moment in time in the flowmeter 2 are passed to a measurement-value processor 10, through a line 2a.

This quantity of air is then passed to a power-delivery means 4, which may be connected to a power monitoring means 5 through a line 4a. Signals which are characteristic of the power delivered are passed to the processor 10 through a line 15a.

The arrangement also includes a temperature measuring means 6 which determines the temperature of the outgoing air, the values measured at that moment being passed to the processor 10 through a line 5a.

The processor 10 may be connected to a measurement-value registering means 11 via a line 10a, or may be connected to the regulating apparatus of a temperature control heating system via a line 10b.

That quantity of air which is allowed to enter the arrangement through the conduit 1 also departs from the arrangement, through a conduit 1a, subsequent to being supplied with energy.

The energy taken up by the aforesaid quantity of air shall now be compared with an energy uptake established theoretically and/or empirically with respect to an air mass without water or with a given water content, these values being stored for example in a memory line and made accessible to the processor 10.

It may also be a matter of simple evaluation processes, in which air flow, power and temperature increase are determined and in which the values obtained at that point in time are processed.

For calibration and measuring purposes it is proposed that a first air mass devoid of water is allowed to pass the energy delivering means 4 and that there is established in conjunction therewith a first temperature difference dependent on the energy delivered, which first temperature difference can be stored in the memory 9. An air mass containing water in liquid phase is then caused to pass the energy delivery means 4, wherewith there is established a second temperature difference dependent on the energy supplied. These values can be passed to a memory (not shown) in the processor 10 and utilized in subsequent measuring procedures.

The processor 10 is provided with means for establishing the temperature discrepancy between the first temperature difference and the second temperature difference and to evaluate the heat content of said air mass, or parts of its heat content, on the basis of the air flow and the energy supplied. In this case there is measured and calculated the power differences between the measurements at a constant temperature differential.

Thus there is used in this respect primarily that temperature difference which is to be expected at a constant or calculatable changed energy emission in the energy delivering means 4 between an air mass devoid of water and an air mass containing water, particularly water in liquid phase.

Another way in which calibration and measurements can be made is to cause a first air flow to pass an energy delivery means 4 and then to cause a second air flow to pass said means. One of these air flows shall comprise an air mass containing water in liquid phase. The energy delivering means is arranged to deliver to the first air flow an amount of energy which produces a pre-determined temperature difference, and to deliver to the second air flow another amount of energy which produces the same temperature difference. It is now possible with the aid of the magnitude of this energy difference to calculate the heat content and therewith also evaluate the liquid-phase water content of the air mass, or the additional energy required to heat the air volume entering the confined space.

In this embodiment it is proposed that the energy delivering means 4 is regulated via the circuit 5 to provide the same temperature difference between the measuring procedures.

Figure 2:
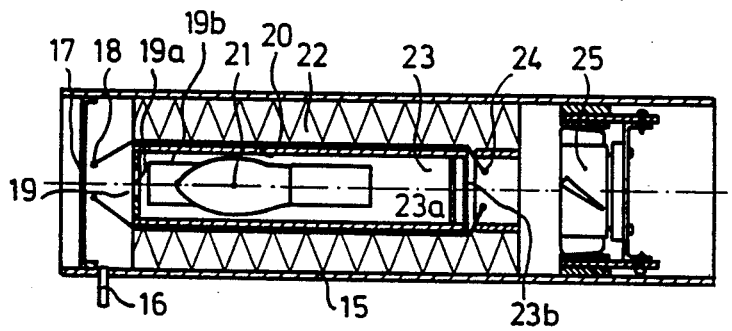
FIG. 2 illustrates in detail an apparatus or a device at present preferred for determining the actual or true heating requirement of an air flow.

FIG. 2 illustrates a proposed embodiment of an arrangement or a device suitable for use in accordance with the principles of the invention illustrated in FIG. 1. The device is here incorporated in a casing 15 provided with a pressure output 16 for establishing a current airflow or quantity of air passing through the apparatus per unit of time. The reference 17 identifies an air-mass inlet opening, while immediately adjacent the inlet opening is the cold soldering site of a thermoelement 18. The reference 19 identifies a forwardly located air feeder comprising a recess 19a and a sleeve 19b, whereby the air mass is caused to pass between an inner wall 20 and an energy-delivering means 21 in the form of an electric incandescent lamp. Located between the wall 20 and the wall 15 is a heat-insulating means 22.

The air mass is now permitted to pass around the energy delivering means 21, back to an air feeder 23 comprising a hole 23a and a plate 23b. Immediately downstream of the plate 23b there is located a hot soldering site 24 of the thermoelement. The air mass is driven through the apparatus by a fan 25.

It is important that the flow of air past the means 21 is so adapted that the energy delivered thereto has time to convert water present in liquid phase to vapour.

The heat capacity or heating requirement of the air can be detected either intermittently or continously. When said heat capacity or heating requirement are detected continuously a constant power to the means 21 is proposed, and that temperature differences resulting from the energy discrepancy constitutes a control magnitude for the regulating apparatus 12.

Figure 3:
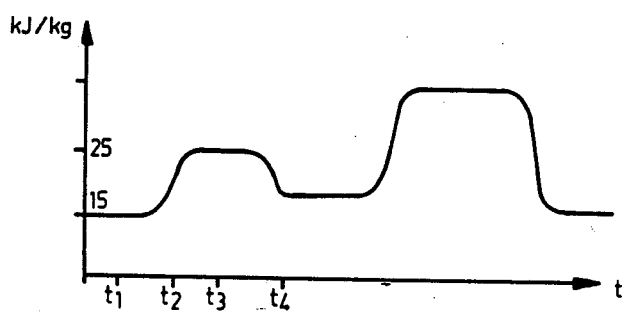
FIG. 3 is a diagram showing time-dependent variations in the heat requirement of an air volume.

FIG. 3 illustrates the actual and the changed heating requirement of the air in dependence of time (t).

In previously known regulating apparatus the heating requirement of the air has been considered a constant, for example the value "15" and constitutes the values applicable to dry air. At the time point "$t_1$", the known regulating apparatus consequently function satisfactorily, since it is assumed that solely the heating requirement of the air, without water in liquid phase, exhibits a heating requirement corresponding to the value "15".

At the time point "$t_3$" the heating requirement of the air is "25", i.e. a greater amount of energy is required to raise a given air volume to a desired temperature difference. Consequently, there is required a control signal which produces a calculated further addition of energy.

Such a control signal could be given the significance temporarily, between the time points $t_2$ and $t_4$, of providing a control signal at the regulating device 12 which demands a significant and clearly determined energy supply over and above one or more remaining control signals.

Figure 4:
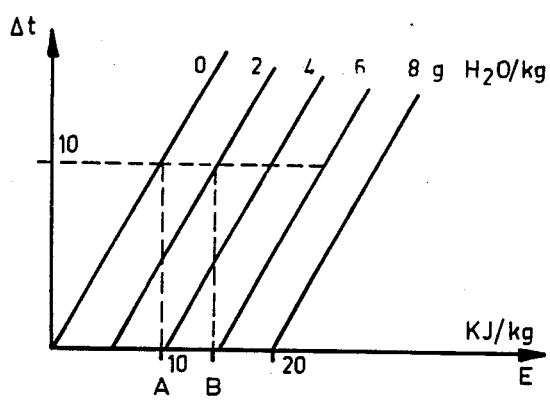
FIG. 4 is a diagram showing temperature differences in respect of an air volume having different heating requirements in dependence on energy supply.

FIG. 4 is a diagram showing the temperature difference to be expected in the case of an air volume having different heating requirements in dependence on the energy supply. The diagram is somewhat simplified.

It can be assumed that for a given increase in temperature, say 10° C., there is required a certain energy supply, say a value "A", for an air volume which lacks water in liquid phase.

If the air volume contains 2 g of water in liquid phase, the amount of energy required for the same temperature increase corresponds to the value "B".

In such a case the regulating apparatus would cause additional energy to be supplied to the air volume in an amount corresponding to the energy difference "B-A".

The remaining curves apply to 4, 6 and 8 g water in liquid phase and it is obvious that the additional energy which need be supplied to the air volume increases in keeping with the increased water content of the air volume.

Thus, the temperature difference concerns the difference between the desired inner temperature and the prevailing ambient temperature.

There can be applied to the regulating apparatus 12, via the arrangement or device, a control signal which is dependent on the actual heating requirement of the air volume at that moment in time or, in a regulating arrangement functioning with a correction factor for constant heating requirement, there can be applied via the regulating arrangement a control signal which is dependent on a part of the heating requirement of the air volume, for example the part exceeding a constant applicable solely to air.

The aforegoing description has taken as its starting point the circumstance that the total heating requirement of the air varies in dependence on the liquid-water content thereof. The heating requirement of the air can be considered as a percentage to which the heat of vapourization of the water shall be added proportional to the temperature increase.

Against this background, the arrangement can evaluate the energy, according to FIG. 4, consumed and illustrated horizontally between the curves "B-A".

As an example of the variations in the heating reuquirement it can be mentioned that a temperature increase of 10° C. in the case of an air volume devoid of water is 10 kJ/kg air, while in the case of 6 g water per kg air the heating requirement is 25 kJ/kg air.

The volumetric magnitude of the ventilation air passing the confined space per unit of time is established by means not shown.

It will be understood that the invention is not restricted to the aforedescribed embodiment given by way of example, and that many modifications are possible within the scope of the inventive concept defined in the following claims. The fact that the invention has been described with reference to air in no way limits the practical use of the invention, since gases and gaseous mixture other than air can also be used.

We claim:

1. A regulating arrangement for controlling the supply of heat to a confined space, said space receiving venetilation air, said arrangement comprising heat source means for supplying heat to the ventilation air, regulating means for controlling the heat supplied by the heat source means, and a measurement-value detecting device operatively connected to said regulating means so that the heat delivered by the heat source means is controlled in dependence on the detected measurement values, said mesurement-value device including means for detecting a prevailing heating requirement of the ventilation air;

said detecting means detecting an amount by which heat required to raise the temperature of an air mass to a predetermined level exceeds a pre-determined heating requirement, said detecting means including an energy delivery means, means for communicating the air mass with the energy delivering means, means for measuring the energy taken-up by the air mass and its heat content and means for comparing the energy taken-up by said air mass with an energy uptake applicable to an air mass having a predetermined water content in liquid phase, said arrangement including means for evaluating from the established energy difference a prevailing change in heating requirement of the air.

2. The arrangement according to claim 1, wherein the detecting means detects a requisite energy addition significant of a desired temperature change in a volume of air relative to an energy addition required to achieve a desired change in temperature of an air volume having a pre-determined heating requirement.

3. The arrangement according to claim 2 wherein the detecting means detects the amount of water in liquid phase present in the air.

4. The arrangement according to claim 3, wherein information obtained from the detecting means is supplied to the regulating means and allotted therein a higher priority than information obtained from other measurement-value detecting devices, the regulating means producing a correction against an increase in heat supply when the prevailing heating requirement exceeds a predetermined heating requirement.

5. The arrangement according to claim 2 wherein information obtained from the detecting means is supplied to the regulating means and allotted therein a higher priority than information obtained from other measurement-value detecting devices, the regulating means producing a correction against an increase in heat supply when the prevailing heating requirement exceeds a predetermined heating requirement.

6. The device according to claim 1, wherein the energy delivering means is arranged to be controllably set to maintain constant temperature differences between input and output air masses; the energy delivering means arranged to deliver a lowest energy level which enables total vaporaization of the water content in liquid phase of the air; such that a higher energy level constitutes a measurement of an increase in heating requirement.

7. The device according to claim 1, wherein said detecting means includes an air passage outlet means for measuring flow, means for detecting the temperature difference between the temperature of ingoing air and the temperature of outgoing air, and a heating source around which the air is caused to pass, whereby vaporforming heat of the water content may be established.

8. The arrangement according to claim 1 wherein the detecting means detects the amount of water in liquid phase present in the air.

9. The device according to claim 8, wherein the energy-delivering means is arranged to be set to one of a plurality of energy levels; said detecting means evaluating the temperature between input and output air; the energy delivering means being alloted an energy level which enables total vaporization of the water content in liquid phase of the air; such that a decrease in temperature difference constitutes a measurement of an increase in heating requirement.

10. The arrangement according to claim 8 wherein information obtained from the detecting means is suppied to the regulating means and allotted therein a higher priority than information obtained from other measurement-value detecting devices, the regulating means producing a correction against an increase in heat supply when the prevailing heating requirement exceeds a predetermined heating requirement.

11. A regulating arrangement for controlling the supply of heat to a confined space, said space receiving ventilation air, said arrangement comprising heat source means for supplying heat to the ventilation air, regulating means for controlling the heat supplied by the heat source means, and a measurement-value detecting device operatively connected to said regulating means so that the heat delivered by the heat source means is controlled in dependence on the detected measurement values, said measurement-value device including means for detecting a prevailing heating requirement of the ventilation air; information obtained from the detecting means being supplied to the regulating means and allotted therein a higher priority than information obtained from other measurement-value detecting devices, the regulating means producing a correction against an increase in heat supply when the prevailing heating requirement exceeds a predetermined heating requirement.

* * * * *